United States Patent [19]

Häfner

[11] Patent Number: 4,832,140

[45] Date of Patent: May 23, 1989

[54] PLATFORM WEIGHING APPARATUS AND METHOD FOR PRODUCING THEREOF

[75] Inventor: Hans W. Häfner, Aichach, Fed. Rep. of Germany

[73] Assignee: Pfister GmbH, Augsburg, Fed. Rep. of Germany

[21] Appl. No.: 253,922

[22] Filed: Oct. 7, 1988

Related U.S. Application Data

[63] Continuation of Ser. No. 13,994, Feb. 12, 1987, abandoned.

[30] Foreign Application Priority Data

| Feb. 13, 1986 | [DE] | Fed. Rep. of Germany | 3604421 |
| Feb. 13, 1986 | [DE] | Fed. Rep. of Germany | 3604419 |
| Apr. 3, 1986 | [DE] | Fed. Rep. of Germany | 3611095 |

[51] Int. Cl.[4] .............................. G01G 19/02
[52] U.S. Cl. ........................ 177/134; 177/1; 177/135
[58] Field of Search ........................ 177/1, 134, 135

[56] References Cited

U.S. PATENT DOCUMENTS

| 4,177,868 | 12/1979 | Sanders et al. | 177/211 |
| 4,333,543 | 6/1982 | Pietzsch et al. | 177/134 |
| 4,339,010 | 7/1982 | Malikov et al. | 177/134 |
| 4,549,962 | 10/1985 | Leiman | 177/134 |
| 4,572,308 | 2/1986 | Gisecke et al. | 177/134 X |

FOREIGN PATENT DOCUMENTS

| 0097734 | 1/1984 | European Pat. Off. |
| 0108164 | 5/1984 | European Pat. Off. |
| 80218617 | 8/1960 | Fed. Rep. of Germany |
| 1953048 | 5/1970 | Fed. Rep. of Germany |
| 20027581 | 7/1970 | Fed. Rep. of Germany |
| 2244912 | 3/1973 | Fed. Rep. of Germany |
| 22631454 | 6/1974 | Fed. Rep. of Germany |
| 2439266 | 2/1976 | Fed. Rep. of Germany |
| 27433961 | 4/1979 | Fed. Rep. of Germany |
| 81131003 | 5/1981 | Fed. Rep. of Germany |
| 3030914 | 4/1982 | Fed. Rep. of Germany |
| 0446122 | 4/1936 | United Kingdom ............ 177/135 |

OTHER PUBLICATIONS

Inustrie-Anzelger, pp. 21–24, Publication date:May 2, 1980: "Schalung and Rustung", pp. 561–562, Author: Labutin, Publication date: 1975.

Primary Examiner—George H. Miller, Jr.
Attorney, Agent, or Firm—Armstrong, Nikaido, Marmelstein, Kubovcik & Murray

[57] ABSTRACT

A platform weighing apparatus is at least partially made of polymeric concrete. With one embodiment a lost self-supporting shuttering made of polymeric concrete is used for forming the platform of the weighing apparatus and a base frame is made of polymeric concrete. With another embodiment the platform is structured with cavities and made essentially of polymeric concrete. The method according to the invention permits molding of the shuttering or the complete platform at a manufacturing site with easy transportation and assembly at an operational site.

44 Claims, 3 Drawing Sheets

PLATFORM WEIGHING APPARATUS AND METHOD FOR PRODUCING THEREOF

This application is a continuation of application Ser. No. 013,994 filed Feb. 12, 1987.

TECHNICAL FIELD

The present invention relates to a platform weighing apparatus and a method of producing thereof by moulding or casting. The platform weighing apparatuses of the invention may be used for high loads, in particular for truck weighing systems, or smaller loads, exemplary as bathroom scales.

BACKGROUND ART

The European Patent Application Publication No. 0097734 discloses a truck weighing apparatus having a platform made of usual concrete, the platform being supported by force measuring elements in a pit made of usual concrete and forming a base the top of which being provided with a circumferential frame the top surface of which flushing with the top surface of the platform. The platform and the frame are made at the operational site by using a lost, self-supporting shuttering or form for the platform. The form consists of a plurality of form elements made of steel sheets which are fixedly secured to each other by screws or rivets. Base members for supporting the force measuring elements may be casted separately or simultaneously with the platform. The production and assembly of the self-supporting form using steel sheets are time-consuming and expensive in respect of the material used, since each steel sheet has to be formed individually and secured to another steel sheet. The concrete used as restricted in its tensile strength, such that heavy reinforcements and a considerable thickness is necessary when the apparatus is used as a truck weighing apparatus. The base member in the pit must have an exactly defined form and high-quality concrete must be used therefore. Also, considerable care is necessary when casting the frame of the base member. There is a relatively wide gap between the platform and the frame permitting penetration of dirt and humidity into the pit. Moreover, specific bumpers made of metal are provided to restrict a lateral movement of the platform within the base member. The force measuring elements arranged between the platform and the bottom of the base member can be accessed from the pit only necessitating a separate entrance thereto.

The European Patent Application Publication No. 0108164 discloses a platform weighing apparatus using a platform made of steel provided with openings for inserting the force measuring elements.

The U.S. Pat. No. 4,549,622 discloses a platform weighing apparatus the platform of which is made of concrete and is supported on shear beam type load cells arranged at each corner of the platform. Support means for the platform and the load cells are of the self-restoring type absorbing any lateral forces.

At least a dozen years ago another type of concrete has become known which is called "polymeric concrete". This material uses synthetic resins as a binder for filler materials, as sand. Polymeric concrete has a far better tensile strength than usual concrete and an excellent resistancy against chemical substances. Up to now this material has been used in replacement of usual concrete for plates and tubes and for support bases of tooling machines. However, up to now polymeric concrete was not used in connection with weighting systems, apparently because of the quite different characteristics in respect of thermal expansion and costs.

SUMMARY OF THE INVENTION

It is an object of the present invention to provide a platform weighing apparatus manufactured with considerably reduced efforts in respect of time and costs.

It is another object of the present invention to provide a platform weighing apparatus which quite simply may be produced at an operational site.

It is a further object of the present invention to provide a platform weighing apparatus being highly resistant against chemical substances.

It is a further object of the present invention to provide a platform weighing apparatus which may be prefabricated in a plant and which is easily transportable to an operational site and easy to put into function.

It is a further object of the present invention to provide a method for manufacturing a platform weighing system which allows a simple and fast fabrication at an operational site using pre-fabricated elements.

It is a still further object of the present invention to provide a platform weighing apparatus having an extremely low overall height.

It is a still further object of the present invention to provide a platform weighing apparatus without any mechanical linkage and without any bumpers between the platform and the base member.

According to the invention a heavy duty weighing apparatus for trucks, equipment and the like includes a platform mountable in a ground pit on force measuring elements resting on concrete support means, the platform comprising a lost self-supporting shuttering pre-fabricated of polymeric concrete filled, at an operational site, with cement concrete.

According to another aspect of the invention a method of manufacturing a heavy duty platform weighing apparatus comprises the steps pre-fabricating a shuttering for said platform by moulding of polymeric concrete material at a manufacturing site; transporting said shuttering to an operational site; and connecting said platform by filling said shuttering with cement concrete.

According to another aspect of the invention a platform weighing apparatus comprises a platform structured by including cavities and pre-fabricated of polymeric concrete by moulding; a base means; and force measuring elements arranged between said platform and said base means.

DESCRIPTION OF PREFERRED EMBODIMENTS OF THE INVENTION

FIGS. 1 to 4 show embodiments of a first type of platform weighing apparatuses according to the invention particularly adapted to be used in truck weighing systems.

Figure 1:
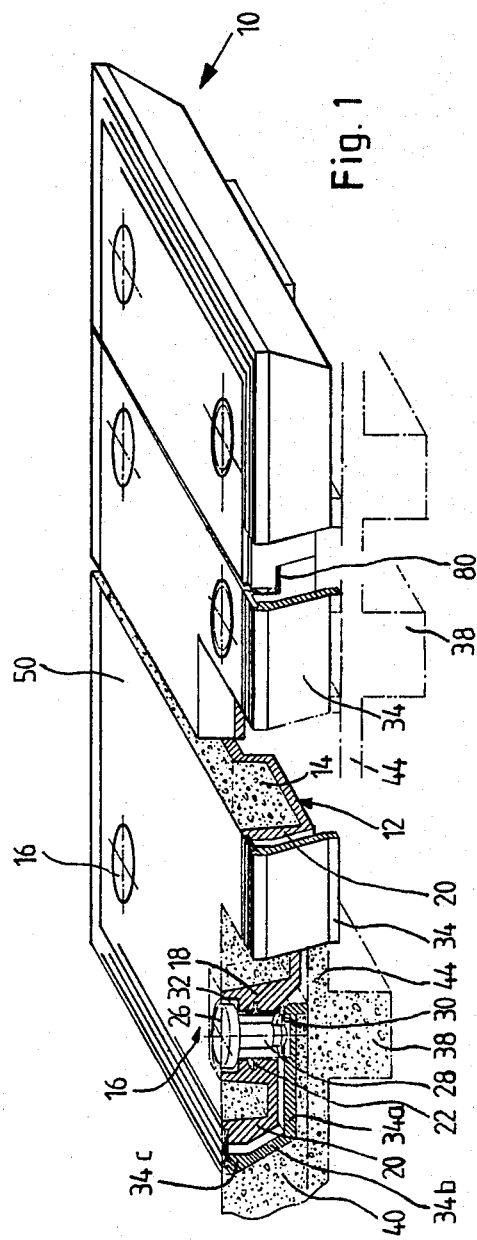
FIG. 1 is a perspectivic view, partially in section, of a first embodiment of a truck weighing apparatus according to the invention.

FIG. 1 shows a first embodiment of a platform-type weighing apparatus, especially adapted as a vehicle or truck weighing apparatus. A platform 10 loosely fits into a pit essentially defined by a base frame 34. This base frame 34 comprises a lower horizontal part 34a in the inner region and a part 34b extending upwards and preferably outwards from the lower horizontal part 34a. At the top the part 34b ends in a preferably broadened head ledge 34c having a flat upper horizontal face surface. The base frame may be reinforced by having the free edge of the horizontal part 34a bent downwards.

According to the invention the platform 10 comprises a self-supporting shuttering or form 12 having a peripheral side wall 20 the outer surface of which is adapted to the inclination of the part 34b of the base frame 34.

According to the invention the selfsupporting form 12 and preferably also the base frame 34 are made of so-called "polymeric concrete". This material is known per se and comprises 3 to 5% of a synthetic resine exemplary acrylic resin and binding filler materials, mainly sand ($SiO_2$) having a grain size of 0 to 8 mms. This polymeric concrete may further have embedded glass, steel and/or carbon fibres. If desired, a reinforcement in the form of a mat of steel or fibres may be embedded.

In contrast to the known arrangement mentioned above such a lost self supporting polymeric concrete form 12 may be produced in a plant in large quantities by simply casting in an appropriate mould. Due to the relatively low weight it is easy to place it on a truck and to transport it to the site of operation. The same is true for the base frame 34.

At the operation site there is no need for a shuttering or form-work for forming the pit, at it is necessary for known weighing apparatuses. Rather, after digging an appropriate pit, only in those regions where the platform 10 is supported by force measuring elements 16 supporting beams 38 are provided in a non-freezing depth made of usual lean concrete. Preferably, the ground is then covered with a thin plane layer 44 of lean concrete as well. The pit has such a size that there is enough peripheral space for filling in further lean concrete 40 after inserting the base frame 34, the horizontal top surface of the part 34c of the base frame flushing with the road surface. Preferably, the ground around the pit is compacted before these steps. It should be noted that the pit is formed by the layer 44 and the base frame 34 only. By filling in the lean concrete 40 penetrating into the region below the horizongal part 34a of the base frame 34 the apparatus obtains the desired stability.

In a similar manner, the platform 10 is completed at the operational site by filling the self-supporting form 12 of polymeric concrete with common concrete as used for weighing platforms before, such that a plane top surface 50 is obtained. The bottom of the form 12 may be provided with reinforced longitudinal beams extending in parallel to the longitudinal edges of the platform 10 whilst the middle region may have a lower thickness as may be seen from FIGS. 1 and 2.

The arrangement of the force measuring elements 16 at the platform ends and at the junctions of platform elements put together (as it will be explained later on) is of particular importance for the invention. As may be seen from FIG. 1 the force measuring elements 16 are housed in steel cylinder 22 fixedly cast into a polymeric concrete column 18 forming an integrated part of the form 12.

The upper end of the steel cylinder 22 may be provided with an inner threading 32 into which a force introduction plate 26 provided with an outer threading may be screwed in. With the embodiment according to FIG. 1 the force measuring device 30 of the force measuring element 16 is supported by the inner region of the horizontal part 34a of the base frame 34. Thus any force exerted to the top surface 50 of the platform 10 is transmitted from the force introduction plate 26 to the force measuring device 30 by means of known restoring pins or self-errecting rolling bodies 28. The radii of the curved face surfaces of the restoring pins 28 are selected relatively large. As known in the weighing field these face surfaces engage spherical recesses having an even larger radii of curvature.

Figure 2:
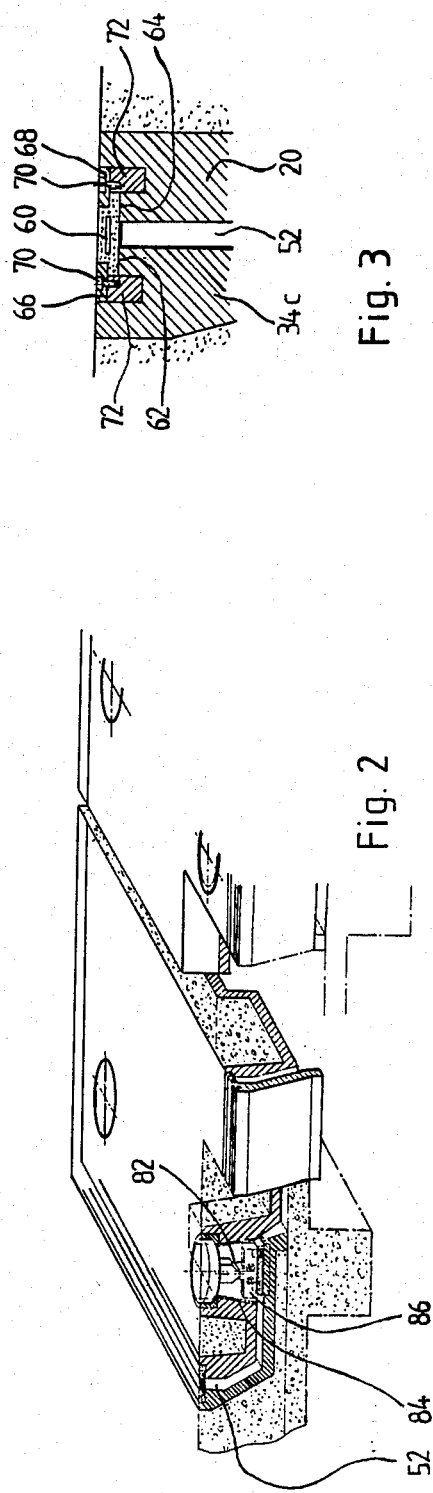
FIG. 2 is a perspectivic view similar to that of FIG. 1 of a modified embodiment using a different type of force measuring element.

As may be seen from FIGS. 1 and 2, the force measuring element 16 may be inserted into the platform 10 from the topside thereof which facilitates maintainance and exchange of the force measuring elements 16. Housing the force measuring devices 30 in the polymeric concrete columns 18 and in particular providing the steel cylinder 28 results in a remarkably small overall height of the apparatus, since between the bottom side of the form 12 and the lean concrete layer 44 only a small gap is required.

As force measuring device 30 usual devices are applicable as piezoresistive force measuring cells.

As a modification of the embodiment of FIG. 1, FIG. 2 shows a shearing-type strain gauge 82 used as a force measuring element, the force introduction being achieved by a known pan/edge bearing.

It should be noted, that the force introduction plate 26 may be replaced by a differently formed plate being inserted into an appropriate opening at the top side of the platform 10 with the only requirement that such a plate is immovably secured to the platform 10. Also, the steel cylinder 22 may be replaced by an insert 84 frusto - conically opened in downward direction. Such an insert 84 may be formed at its top end with a threaded rim of a larger diameter. Such a design has the same function as the steel cylinder 22 which is provided with laterally extending flanges which ensure the immovable position thereof.

Figure 3:
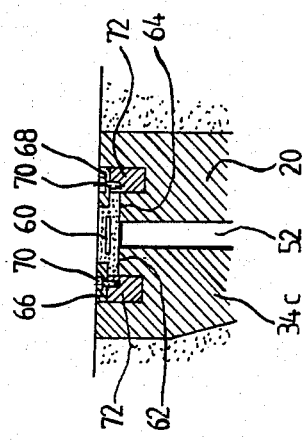
FIG. 3 is an enlarged sectional view of an elastic connection between a base frame and a platform of the embodiments of FIG. 1 and 2.

According to a further aspect of the invention, a gap 52 (FIGS. 2 and 3) between the upper edge of the platform 10 and the upper inner edge of the base frame 34 is covered by a tight sealing. According to the invention this gap 52 is closed by a cover strip 60 made of elastomeric material, exemplary having a Shore Value in the range of 40 to 60. Preferably, the cover strip is made of rubber or synthetic material as commonly used for conveyor belts. The cover strip 60 may have embedded a band or net of steel or similar material as a reinforcement. The width of the cover strip 60 is such that it may be conveniently secured both to the platform 10 and the base frame 34. FIG. 3 illustrates details of an exemplary fixing. The peripherally extending cover strip 60 is fitted in appropriate recesses 62 and 64 at the inner upper edge of the part 34c of the base frame 30 and the outer upper edge 20 of the form 12. By means of securing ledges or plates 66 and 68 arranged along the cover strip 60 and partially overlying it, the cover strip 60 is clamped to the base frame part 34c and the upper edge 20 of the form 12. Such a clamping may be accomplished by screws 70 screwed into threaded inserts arranged in appropriate distances in the mould for the base frame 34 and the form 12, respectively. The threaded inserts are designated with the reference numeral 72. Such a clamping ensures that no humidity and dirt may penetrate into the interior of the weighing apparatus. On the other hand, the cover strip 60 connects the base frame 34 and the form 12 elastically to such an extent that the cover strip acts as a horizontal guidance of the platform 10. Thus, no bumpers are necessary. Furthermore, the use of such a clamped cover strip 60 reduces the safety distance between the platform 10 and the base frame 34 considerably.

Truck weighing apparatuses having an extraordinary length may use a platform consisting of several modules which are connected with each other at step-like formed engaging surfaces, elastomeric material 80, exemplary silicone rubber, filling any gap therebetween. The overall arrangement is kept together by the peripheral cover strip 60.

To sum up, a preferred method of manufacturing the platform weighing apparatus according to the invention is as follows:

1. Casting or moulding the lost self-supporting form 12 and the base frame 34 of polymeric concrete material at a plant;
2. digging out a suitable pit;
3. producing in the pit beams 38 of lean common concrete and providing a lean concrete layer 44 on the pit bottom;
4. inserting the base frame 34 into the pit, if desired after pressing adjacent soil;
5. inserting the form 12 into the base frame 34 together with arranging the force measuring elements 16 in the form 12;
6. securing the cover strip 60 at the base frame 34 and the form 12; and
7. filling the space between the rim of the pit and the exterior of the base frame 34 with lean concrete 40 and filling the form 12 with common concrete.

Even if the base frame 34 and the pit is produced in the usual way there are still advantages in using a pre-produced lost self-supporting form consisting of polymeric concrete. Independently, the provision and clamping of the cover strip 60 is of importance for the platform weighing apparatus according to the invention, serving both as a sealing and as a bumper. Also, inserting the force measuring element from the top of the platform is extremely useful, since it does no more require any access to the space below the platform 10 resulting in an extremely flat arrangement with an overall height in the order of 200 to 500 mms.

It should be noted, the the cover strip 60 replaces the complex mechanical linkage between the platform 10 and base frame 34 which again contributes to the reduction of the overall height of the apparatus. Method step 7 indicated above enables the transport of the base frame 34 having inserted thereto the form 12 clamped to the base frame 34 by the cover strip 60 as a unit. The platform 10 may then be formed by filling usual concrete into the form 12 simultaneously with fixing the base frame 34 into the pit by filling any spaces therebetween with lean concrete 40. The cover strip 60 advantageously prevents any penetration of concrete into the peripheral gap 52.

The material called "polymeric concrete" before is also known as polymeric casting material. In this connection it is referred to the firm publication KID-INFO K.I.D. Imprägniertechnik GmbH, Georgenstrasse 8, D-8018 Grafing, West-Germany. Polymeric synthetic materials which may be used for polymeric concrete are exemplary epoxy resins (EP), methyl-metacrylate (MMA) resin and unsaturated polyester resin (UP) or mixtures thereof. Filler materials are preferably quartz or chalk powders, quartzite or crushed graphite. Furthermore, glas or preferably carbon fibres may be used. Also, other filler materials may be used as long as they do not undergo any essential chemical reaction with the resin and as long they are dry. It should be noted, that the resins used for the polymeric concrete harden at ambient temperatures. The hardening is initiated by suitable known agents and is completed in a time range between a few minutes and several hours. Since the method of providing moulds for moulding and casting polymeric synthetic material containing filler materials for the production of polymeric concrete is very similar to the preparation of forms for metal casting many measures used in the latter field are applicable for casting polymeric concrete with the additional advantage of hardening at ambient temperatures, such that considerations of high temperatures are eliminated.

Polymeric concrete may be provided with appropriate reinforcements which may project above the surface of the polymeric concrete into the interior of the form 12.

Figure 4:
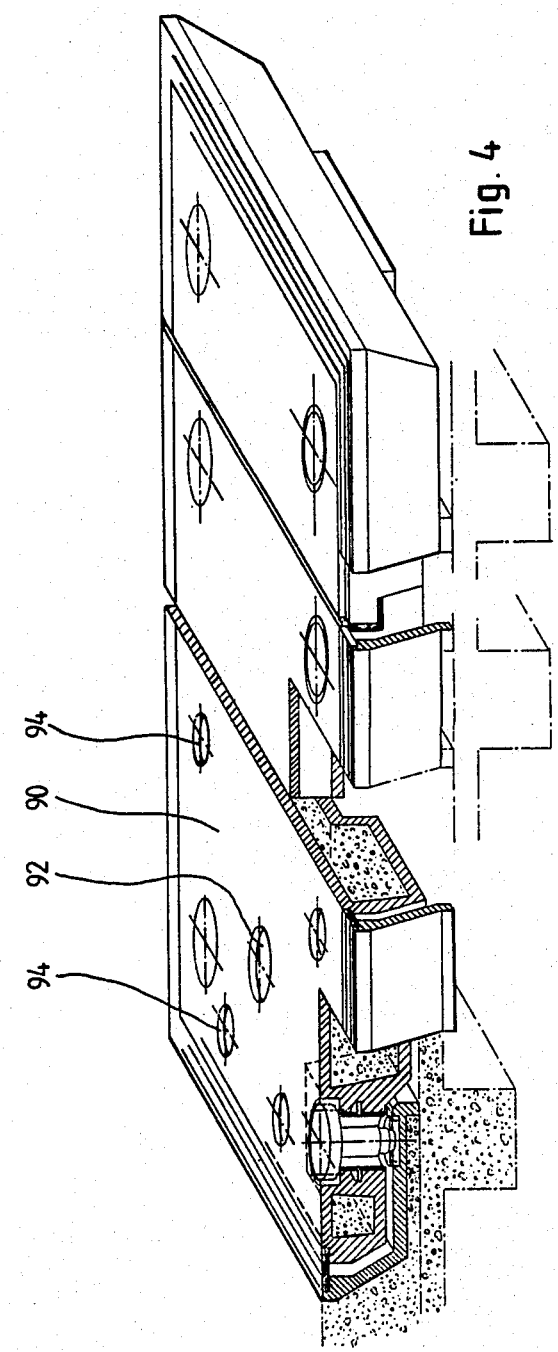
FIG. 4 is a perspectivic view similar to that of FIG. 1 of a further embodiment of a truck-weighing apparatus according to the invention.

FIG. 4 shows an embodiment of the platform weighing apparatus according to the invention with the improvement that in addition the the base frame and the form 12 a sealing 90 is integrated into the form 12 again made of polymeric concrete. This results in an increased stiffness of the form and a highly resistant pavement against chemical and mechanical influences. The cement concrete is filled-in through openings 92 whilst further openings 94 spaced from the openings 92 and having preferably a smaller diameter serve as air outlets and for monitoring the complete filling of the form with concrete. With such a ceiling 92 no fine treatment of the top surface of the platform is necessary and the shape of the platform is exactly defined by the form having the ceiling 92 integrated.

During filling-in of the cement concrete into the form the latter preferably is vibrated for complete filling of the form.

FIGS. 5 to 9 show embodiments of a different type of a platform weighing apparatus using polymeric concrete as a basic material. Whilst this type of platform weighing apparatus may be used for truck weighing systems in a similar manner as the weighing apparatuses according the embodiments of FIGS. 1 to 4 having a platform lowered into a pit and flushing with the ground, the extreme low overall height of the apparatus permits applications where the platform weighing apparatus is just put onto the flat ground and wedges are put on either front side of the apparatus. Moreover, such type of weighing apparatus may be used as a self-contained unit formany other applications of platform scales, f.i. as bath-room scales.

The platform weighing apparatuses according to FIGS. 5 to 9 distinguish from the embodiments of FIGS. 1 to 4 in that for the platform not only a shuttering or form is of polymeric concrete but the whole platform is made of this material.

It should be noted, that these embodiments are shown in FIGS. 5 to 9 rather schematically only without showing specific details as the design of the force measuring elements, the support thereof, the specific form of a pit for the platform, the provision of bumpers etc.. These details are known in the art and do not constitute a part of the invention with the exception of specific features explained below.

Figure 5:
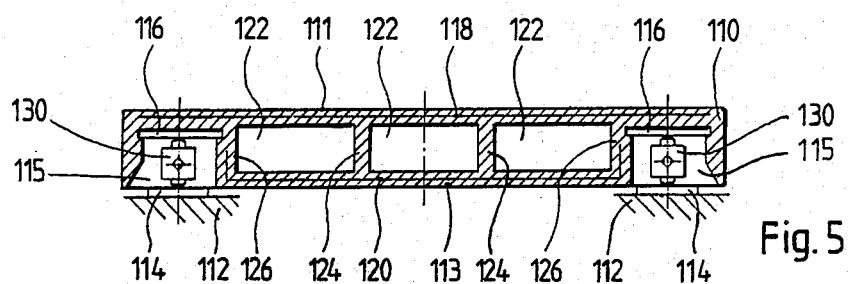
FIGS. 5 are sectional views of embodiments of a different type of platform weighing apparatuses according to the invention.

FIG. 5 schematically illustrates a platform 110 essentially made of polymeric concrete, the platform 110 is supported by known force measuring devices 130, preferably with interposing steel plates 114 and 116 on a base member 112 preferably made of usual concrete or polymeric concrete.

The platform 110 is of honeycomed design having a ceiling 111 which may be provided with appropriate reinforcements 118 consisting of rods or mats of steel or synthetic material and which overlyes cavities 122 further surrounded by a bottom plate 113 having reinforcements 120 embedded therein, outer vertical walls 126 in which the reinforcements 120 are bent upwards and intermediate walls 124 which may be provided with reinforcements as well.

Figure 7:
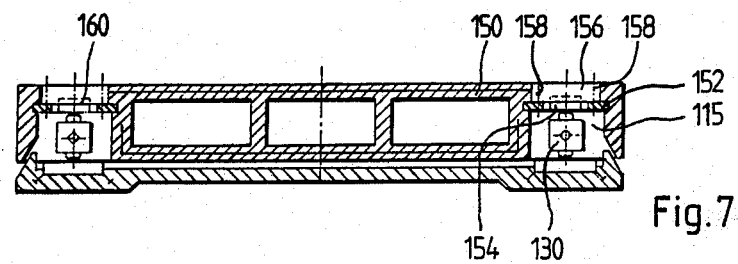

The force measuring devices 130 may be housed in cavities 150 arranged below outer regions of the ceiling 111 and having an open bottom side. These cavities 150 may have the form of longitudinal grooves or their seizes may be limited to a space necessary for housing the forcemeasuring devices 130 at spaced positions in longitudinal direction of the platform 110. Exemplary four force measuring devices 130 may be housed by cavities 150 arranged at the four edges of the platform 110. The cavities 150 may be accessible from the topside through the ceiling 111 which facilitates maintainanace and exchange of force measuring devices (FIG. 7).

With the embodiment of FIG. 5 the force measuring devices 130 support via plates 140 on a base member 112 which may be formed before insertion of the platform 110 in a corresponding pit by using usual concrete.

Figure 6:
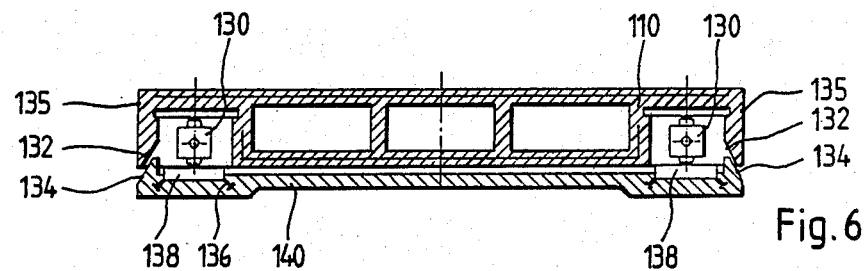

FIG. 6 shows an embodiment using the platform 110 of the embodiment of FIG. 5 in combination with a base plate 140 made of polymeric concrete. The force measuring devices 130 support on metal plates 138 exemplary fixedly moulded via anchorings 136 in the base member 140.

It should be noted, that there is a tapered or sloped longitudinal edge 134 provided at eigher side of the base member 114 opposed by correspondingly inclined longitudinal edges 132 of exterior longitudinal walls 135 extending downwards from the ceiling 111 of the platform 110. The circumferential gap formed between the edges 132, 134 imparts the platform 110 a certain loose, but limits excess horizontal movements of the platform 110 relative to the base member 140.

The base member 140 may be provided with suitable reinforcement elements which are arranged in a mould used for moulding for casting of the base member 140 by using polymeric concrete material. Due to the high tensile strength of the polymeric material the overall weight may be considerably reduced which permits an easy transport and assembly both of the platform 110 and the base member 140.

As mentioned before, the embodiment according to FIG. 6 is applicable for weighing apparatuses and scales adapted for weighing essentially smaller masses in regions of several kgs or of several hundred kgs. With such applications the thickness of the walls of the platform 110 and the base member 140 may be relatively small and the reinforcement elements may be reduced in strength or omitted at all.

FIG. 7 illustrates a modified embodiment of a platform weighing apparatus according to the invention showing the specific design of a platform 150 permitting insertion of the force measuring devices 130 from the topside of the platform 150. In this case the cavities 115 for the force measuring devices 130 are closed at their topside by steel plates 152 casted into the platform and provided with central opening 154 for insertion of a force measuring device 130. After insertion of the force measuring device 130 a cover body 156 is inserted into a recess provided above the steel plate 152 in the platform 150, which cover body 156 is secured to the steel plate 152 preferably by means of screws 158. The cover body 156 exactly fits into the associated opening and flushes at its topside with the top surface of the platform 150. The cover body 156 may be of metal in particular steel or of polymeric concrete. Such a design permits a replacement of the cover body 156 by a steel insert 160 which may be used for gripping the platform 150 by a crane or the like.

In this connection it should be noted that the platforms 110 and 150 may have any desired shape and size resulting from casting the platforms in appropriate moulds. In particular, further cavities 122 may be provided or these cavities may be subdivided by further horizontal and/or vertical walls. For forming the cavities 122 any measures usable in the field of moulding or casting may be used. Thus, lost and, if desired, self-supporting shutterings or forms made of wood, metal or the like may be used. Alternatively, the cavities may be formed by placing synthetic foam bodies in the mould before moulding. Also, as known in the art of moulding sand appropriately shaped into the desired form of the cavities may be used which sand is rinsed out after moulding. Other foam bodies may consist of material which dissolve upon application of chemical substances, as acids.

Figure 8:
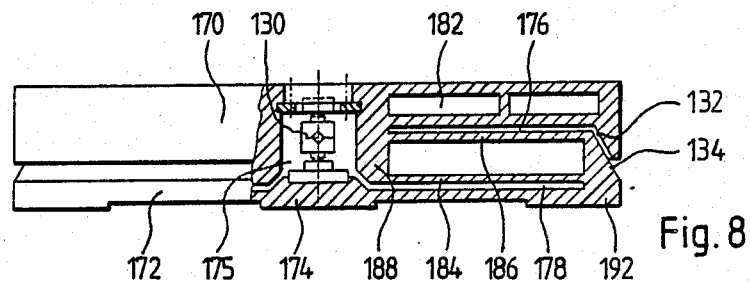

FIG. 8 shows a further embodiment of a platform weighing apparatus according to the invention where the base member and the platform are connected by means of a kind of parallel lever pair as it is commonly used in linkages of mechanical scales. Such a design permits a unitary construction of a platform/base combination. Exemplary, the weighing apparatus may have a circular shape comprising a base member 172, a central column 174 supporting just one force measuring device 130 housed in a cavity 175 formed in a platform member 170. The base member 172 is provided with a rim 192 projecting upwards and having an increased thickness two relatively thin walls 184 and 186 extending in parallel and at distance to each other from said rim 192 radially inwards to a central ring part 188 of the platform member 170, the ring part 188 having an increased thickness as compared with the thickness of the walls 184, 186 and the thickness of the platform member 172. As mentioned before, the two thin walls 184, 186 function as a parallel lever pair balancing or compensating any assymmetrical loading of the platform member 170, as it is well-known in the field of force measuring. Between the lower wall 184 and the upper surface of the base part 172 there exists a relatively thin gap 178. Similarly, there is provided a relatively narrow gap 176 between the topside of the wall 186 and the bottom side of the platform part 170 parallel thereto. The platform part 170 is provided with cavities 182 similar to the cavities 122 of the embodiment of FIG. 5, however, with smaller height.

In the case when the platform weighing apparatus according to FIG. 8 has a squarelike or rectangular shape, again only one force measuring device 130 may be used arranged at the centre of the platform part 170 the parallel lever pair 184, 186 extending both the X- and Y-direction. Alternatively, in the direction of the symmetry axis of the platform part 170 two or several force measuring devices 130 may be arranged in spaced relationship in a direction perpendicular to the paper plane. In this case the parallel lever pair 184/186 will be arranged in a manner and direction only as shown in FIG. 8 from left to right, i.e. in the direction of the paper plane. This means that the parallel lever pair may have a limited width in horizontal and/or vertical direction of the paper plane. However, a flat spread or disklike extension results in the advantage that with this embodiment the base part and the platform part may be unitary moulded in one moulding process and that no further connections are necessary between the the platform part and the base part. Alternatively, the platform part could be horizontally seperated from the base part approximately in the height of the gap 176.

It should be noted, that when casting or moulding the platform and the base member various elements, bearing and connection parts, linkages and so on may be embedded in the polymeric concrete. This is true for electrical elements and the force measuring devices which may be enclosed partially in totoal. Force measuring devices applicable are exemplary those disclosed in the European Patent Application Publication No. 145001.

Figure 9:
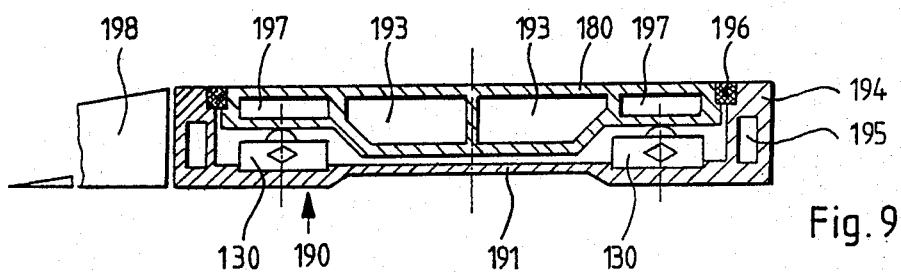

FIG. 9 shows another embodiment of a platform weighing apparatus which may be applicable for quite different measuring ranges in the order of a few kgs up to the order of several tons. With this embodiment the platform weighing apparatus is a freestanding unit manufactured in a plant and easily transported to any operational site. Exemplary, such an apparatus may be used as a wheel load weighing device for trucks, one device each being provided for the wheels of one or more truck axles. In this case, the relatively flat unit with an overall height between 20 and 50 mms may be lowered into the road or may be provided preferably at either front side with a driving-up and driving-down ramp indicated at 198 in FIG. 9.

With this embodiment the base member 190 is provided at least laterally to the driving direction with a side wall part 194 which is provided, depending on the stability requirements, with cavities 195. The side wall 194 preferably has a circumferential extension, the outer shape of the apparatus being of rectangular shape. A platform 180 supports through force measuring devices 130 on the bottom 191 of the base member 190. As a modification in respect of embodiments explained before the platform 180 is provided with cavities 197 in the regions above the force measuring devices 130 which cavities have a lower height. The central part of the platform 180 extends further downwards and has large cavities 193. This design gives an improved stability to the platform.

An important feature of the embodiment of FIG. 9 is the type of tight sealing of the circumferential gap between the exterior peripheral surface of the platform 180 and the interior peripheral surface of the rim 194. For this purpose elastomeric material 196 is filled into said gap which preferably is widened in its upper region. The strongly adhering elastomeric material 196 transmits any lateral forces acting onto the platform 180 to the base member 190. Furthermore, it functions as a bumper limiting any horizontal movement of the platform 180.

It should be noted, that the polymeric concrete used for production of the platform and the base member is that used in connection with the embodiments of FIGS. 1 to 4. This is true for the methods of producing these elements as well.

I claim:

1. A heavy duty weighing apparatus for trucks, equipment and the like including a platform mountable in a ground pit on force measuring elements resting on a concrete support, the platform comprising:
    a lost self-supporting essentially unitary shuttering prefabricated of polymeric concrete at a manufacturing site, said shuttering having an outer contour exactly defining the whole lower circumferential outer contour of said platform and provided with a cavity therein, said shuttering being directly supported by said force measuring elements and filled, at an operational site, with cement concrete.

2. The apparatus of claim 1, wherein said shuttering includes a ceiling wall made of polymeric concrete a top side thereof constituting a load receiving surface of said platform.

3. The apparatus of claim 2, wherein said ceiling wall is prefabricated unitary with said shuttering.

4. The apparatus of claim 2, wherein said ceiling wall is provided with at least one opening for filling-in said cement concrete.

5. The apparatus of claim 4, wherein said ceiling wall is provided with at least one hole arranged in spaced relationship to said at least on opening for permitting escape of air contained in said shuttering and observation of said filling-in of said cement concrete.

6. The apparatus of claim 1 further comprising:
    a supporting base frame pre-fabricated of polymeric concrete and insertable in said ground pit for accommodating said platform therein, a load receiving surface of said platform essentially flushing with an essentially horizontal top face surface of said base frame, said base frame having lower horizontal sections extending inwards for supporting said force measuring elements.

7. The apparatus of claim 6, wherein said lower horizontal sections have inner edges bent downwards.

8. The apparatus of claim 6, wherein said base frame opens in upward direction by having sidewalls inclined to the horizontal, said platform having side walls essentially correspondingly inclined to the horizontal.

9. The apparatus of claim 6, wherein said polymeric concrete of said base frame has reinforcement means embedded.

10. The apparatus of claim 6, wherein said base frame is concreted into said ground pit.

11. The apparatus of claim 1 wherein a bottom of said ground pit is covered by a thin smooth layer of cement concrete.

12. The apparatus of claim 1 wherein said shuttering has formed therein vertical centrally hollow columns extending to a top surface of said platform, said columns having fixedly embedded receptacles for housing said force measuring elements insertable to said receptacles from said top surface.

13. The apparatus of claim 12, wherein said receptacles are made of steel and have an essentially cylindrical form, and have extended rings at their upper ends for receiving supporting plates for said force measuring elements.

14. The apparatus of claim 12, wherein said receptacles are made of steel and have a frustro-conical form narrowing upwards, top ends of said receptacles being formed as extended rings for receiving supporting plates for said force measuring elements.

15. The apparatus of calim 6, wherein a peripheral upper edge of said platform is firmly connected to said horizontal face surface of said base frame by a cover strip made of elastomeric material and bridging a gap formed between said platform and said base frame, said cover strip acting as a means for limiting lateral movements of said platform relative to said base frame and for transmitting any lateral forces introduced to said platform to said base frame.

16. The apparatus of claim 1, wherein for extraordinary long platforms said shuttering is divided into a plurality of modules having steplike face edges for putting said modules together, elastomeric material being interposed between opposing face edges.

17. A heavy duty weighing apparatus comprising a platform mountable in a groupd pit and a base frame place on said ground pit for loosely accommodating said platform therein, said base frame being a frame of polymeric concrete prefabricated at a manufacturing site and having an essentially horizontal top face surface flushing with a force receiving surface of said platform and lower horizontal sections extending inward in said ground pit for supporting force measuring elements on which said platform rests.

18. A method of manufacturing a heavy duty platform weighing apparatus comprising the steps:
pre-fabricating a shuttering having a cavity therein for said platform by molding polymeric concrete material at a manufacturing site, wherein said shuttering has an outer contour exactly defining the whole lower circumferential outer contour of said platform;
transporting said shuttering to an operational site where a ground pit is located; and
placing said shuttering within said ground pit, with force measuring elements therebetween, wherein said cavity of said shuttering is filled with cement concrete at an operational site.

19. The method of claim 18 further comprising:
the step of placing said shuttering into said ground pit before filling-in of cement concrete into said shuttering.

20. The method of claim 18 further comprising the steps of
pre-fabricating a base frame by moulding thereof of polymeric concrete at a manufacturing site;
transporting said pre-fabricated base frame to said operational site; and
securing said base frame in said ground pit by concreting said base frame therein.

21. Method of claim 20 wherein said shuttering is placed into said base frame and secured thereto at said manufacturing site before transporting thereof together to said operational site.

22. The method of claim 21 wherein said shuttering is secured to said base frame by fixing a cover strip of elastomeric material circumferentially both to said base frame and said shuttering.

23. The method of claim 18 further comprising the step of inserting force measuring cells into receptacles formed in said shuttering from a top side of said platform after producing thereof.

24. A platform weighing apparatus comprising:
a platform prefabricated of polymeric concrete by moulding at a manufacturing site, said platform having a substantially rectangular cross-section perpendicular to the surface of said platform and provided with honeycomb-liike cavities therein and open cavities substantially at the circumferential periphery thereof;
a substantially flat base means for receiving said platform thereon; and
force measuring elements arranged within said open cavities leaving a substantially linear clearance between said platform and said base means, said force measuring elements supporting said platform.

25. The apparatus of claim 24, wherein said base means is pre-fabricated of polymeric concrete by moulding.

26. The apparatus of claim 24, wherein said force measuring elements are housed in open cavities provided in said platform said open cavities being open at least in downward direction 27. The apparatus of claim 26, wherein said recesses are accessible through openings provided at a top surface of said platform.

28. The apparatus of claim 27, wherein said open cavities are separated from said openings by annular plates embedded in said platform, said plates having apertures adapted for inserting said force measuring elements, said apertures being closed by inserts adapted to be placed into said openings and fixed to said steel plates, the top surfaces of said inserts essentially flushing with a top surface of said platform.

29. The apparatus of claim 24, wherein at least part of a circumferential lower edge of said platform and of a peripheral edge of said base means are provided with complementary opposing spaced surfaces for limiting any lateral movement of said platform in respect of said base means.

30. The apparatus of claim 24, wherein said platform has a downward circumferential edge and said base means has an upward circumferential edge, said two circumferential edges having opposite slats facing each other.

31. The apparatus of claim 24, wherein a metal plate is provided in at least one of spaces between said force measuring element and said platform and said force measuring element and said base frame.

32. A platform weighing apparatus comprising:
a platform prefabricated of polymeric concrete by molding at a manufacturing site, said platform having a recess therein,
a base means for receiving said platform thereon,
a force measuring element arranged between said platform and said base means,
wherein said platform and said base means are formed by an integral unit of polymeric concrete having a gap at central portion thereof and having a circumferential connecting portion at the edges thereof, said platform further has a central rigid vertical support portion and a lever portion between said support portion and said connecting portion.

33. The apparatus of claim 30 wherein only one said force measuring element is arranged in a center of said platform.

34. The arrangement of claim 32, wherein at least two said force measuring elements are arranged in spaced relationship along a symmetry axis of said platform.

35. The apparatus of claim 32, wherein said platform has a circular shape and said lever portion is a pair of parallel levers.

36. The apparatus of claim 32, wherein said platform has a downward circumferential edge and said base means has an upward circumferential edge, said two circumferential edges having opposite slats facing each other.

37. A method for manufacturing a platform weighing apparatus comprising the steps:
    preparing a mould according to the outer contours of a platform at a manufacturing site;
    placing form bodies into said mould corresponding to cavities to be formed in said platform;
    moulding said platform by filling-in of polymeric concrete into said mould; and
    removing said platform after solidification of said polymeric concrete from said mould.

38. The method of claim 37, wherein said form bodies are at least formed as lost shuttering elements.

39. The method of claim 37, wherein said form bodies are made of synthetic foam material.

40. The method of claim 37, wherein said form bodies are made of removable material which is removed from said finished platform.

41. The method of claim 37, wherein a base means for supporting said platform is moulded of polymeric concrete.

42. The method of claim 41, wherein said base means is moulded integrally with said platform.

43. The method of claim 37, wherein form bodies are placed into said mould for forming recesses for accommodating force measuring elements, said recesses opening downwards and having openings at a top surface of said platform and further comprising the steps of inserting said force measuring cells from said top surface of said platform into said recesses and closing said openings.

44. The method of claim 37 further comprising the step of placing reinforcement means into said mould before filling-in polymeric concrete.

* * * * *